United States Patent
Asai (10) Patent No.: US 7,643,651 B2
(45) Date of Patent: Jan. 5, 2010

(54) INFORMATION PROCESSING DEVICE

(75) Inventor: Daisuke Asai, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 678 days.

(21) Appl. No.: 11/502,417

(22) Filed: Aug. 11, 2006

(65) Prior Publication Data

US 2007/0035775 A1    Feb. 15, 2007

(30) Foreign Application Priority Data

Aug. 11, 2005  (JP)  .............................. 2005-233804

(51) Int. Cl.
G06K 9/00       (2006.01)
H04N 1/40       (2006.01)
(52) U.S. Cl. ...................................... 382/100; 358/3.28
(58) Field of Classification Search ................. 382/100, 382/232; 380/51, 54, 201, 210, 252, 287; 370/522–529; 283/72, 74–81, 93, 113, 901, 283/902; 713/176, 179; 348/461, 463; 358/3.28
See application file for complete search history.

(56) References Cited

U.S. PATENT DOCUMENTS 6,567,533 B1 *  5/2003  Rhoads ........................ 382/100

2002/0149600 A1  10/2002  Van Splunter et al.
2004/0168130 A1   8/2004  Ishizaki

FOREIGN PATENT DOCUMENTS

CN    1461457 A    12/2003
JP    11-298717    10/1999

OTHER PUBLICATIONS

Chinese Office Action, with English translation, issued in Chinese Patent Application No. CN 200610115715.7, mailed Jun. 27, 2008.

* cited by examiner

*Primary Examiner*—Abolfazl Tabatabai
(74) *Attorney, Agent, or Firm*—Banner & Witcoff, Ltd.

(57) ABSTRACT

There is provided an information processing device, which comprises a determination unit to analyze a main image and a watermark image to be added to the main image to determine an overlap part of the main image and the watermark image, a transparency adjustment unit to adjust transparency of the overlap part in the watermark image to first transparency, and an overlap processing unit to obtain an overlap image of the main image and the watermark image of which transparency is adjusted by the transparency adjustment unit by overlaying the watermark image of which transparency is adjusted on the main image.

12 Claims, 10 Drawing Sheets

INFORMATION PROCESSING DEVICE

CROSS-REFERENCE TO RELATED APPLICATION

This application claims priority under 35 U.S.C. §119 from Japanese Patent Application No. 2005-233804, filed on Aug. 11, 2005. The entire subject matters of the application are incorporated herein by reference.

BACKGROUND

1. Technical Field

Aspects of the present invention relate to an information processing device having a watermark printing function.

2. Related Art

Printer drivers having a watermark printing function are widely used. Through the watermark printing function, a watermark image (e.g., watermark letters) can be added to a main image (e.g., a document) to be printed. For example, an indication "Confidential", "Important", "Urgent" or "No Copy" is written on a document to be printed so as to attract the attention of readers of the document. An example of a printing device having the watermark printing function is disclosed in Japanese Patent Provisional Publication No. HEI 11-298717.

Figure 10A:
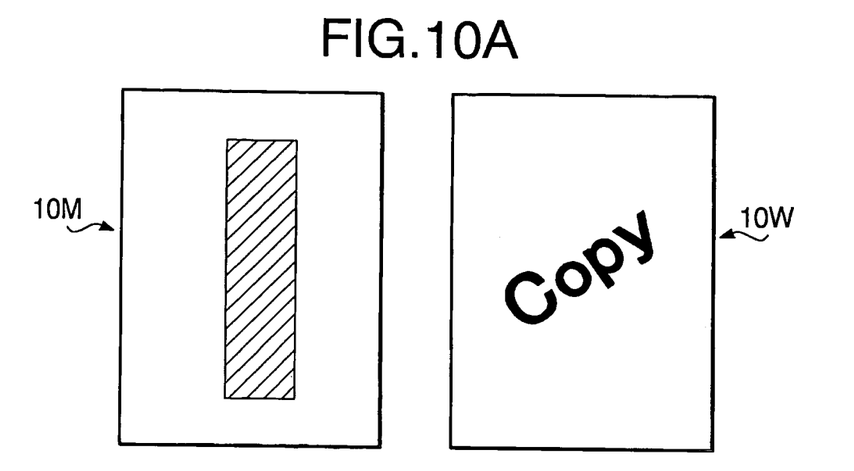
FIGS. 10A to 10C are explanatory illustrations concerning a conventional watermark printing function.
Figure 10B:
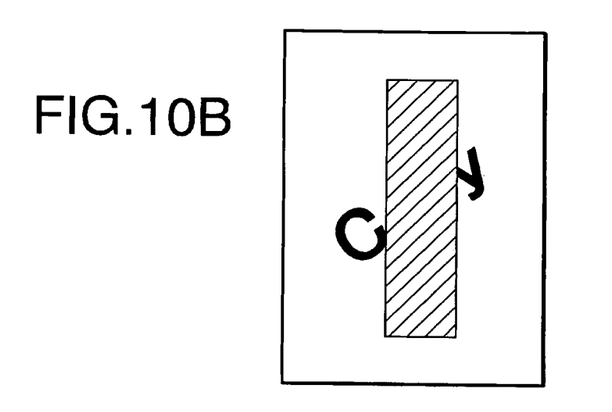
Figure 10C:
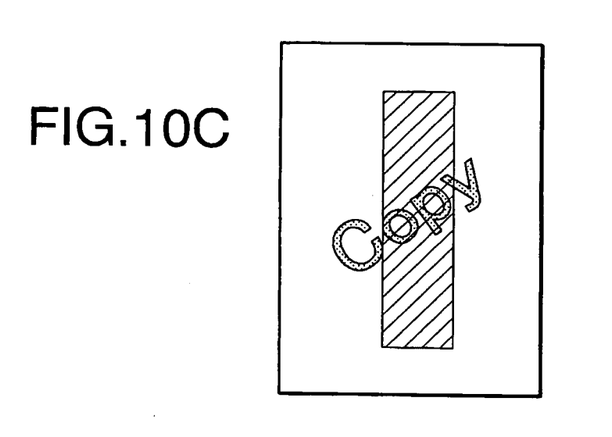

In general, the watermark printing function includes a background mode and a transparent mode. FIGS. 10B and 10C illustrate examples of an overlap image of a main image 10M and a watermark image 10W (see FIG. 10A) printed in the background mode and transparent mode, respectively. In the background mode, the main image 10M is written on the watermark image 10W (see FIG. 10B). Since in this case the watermark image 10W is covered with the main image 10M, there are cases where readers of the main image (e.g., a document) hardly recognize the watermark image 10W (i.e., a word "Copy") depending on the size of the watermark image 10W.

As shown in FIG. 10C, in the transparent mode, the watermark image 10W undergoes a transparent process for giving transparency to the watermark image 10W, and thereafter the watermark image which has undergone the transparent process is written on the main image 10M. Since the watermark image has undergone the transparent process, a reader of the overlap image shown in FIG. 10C is able to recognize both of the main image and the watermark image in an overlap portion between the main image and the watermark image. However, in the transparent mode, a part of the watermark image not overlapping with the main image also undergoes the transparent process. Therefore, readers of the overlap image shown in FIG. 10C may feel that the entire watermark image is light and difficult to recognize.

SUMMARY

Aspects of the present invention are advantageous in that an information processing device, having a watermark printing function and capable of forming a clear watermark image even in a transparent mode, is provided.

DETAILED DESCRIPTION

General Overview

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to an aspect of the invention, there is provided an information processing device, which comprises a determination unit to analyze a main image and a watermark image to be added to the main image to determine an overlap part of the main image and the watermark image, a transparency adjustment unit to adjust transparency of the overlap part in the watermark image to first transparency, and an overlap processing unit to obtain an overlap image of the main image and the watermark image of which transparency is adjusted by the transparency adjustment unit by overlaying the watermark image of which transparency is adjusted on the main image.

With this configuration, it is possible to change the first transparency of the overlap part of the watermark image so that both of the main image and the watermark image are recognizable in the overlap image as in the case of the transparent mode. In addition, since the adjustment of the transparency can be applied only to the overlap part, it becomes possible to keep a non-overlap part in the watermark image as well as the entire watermark image and the main image recognizable.

In at least one aspect, the transparency adjustment unit further adjusts transparency of a non-overlap part in the watermark image to a second transparency.

With this configuration, it is possible to adjust the transparency of the non-overlap part to desirable transparency so that the entire watermark image and the main image are recognizable.

In at least one aspect, the information processing further comprises a transmission unit to transmit the overlap image to an external printer through a network.

In at least one aspect, the second transparency is equal to transparency of the watermark image defined before adjustment by the transparency adjustment unit.

With this configuration, it is possible to keep the non-overlap part of the watermark image recognizable while simplifying the transparency adjustment.

In at least one aspect, the information processing device further comprises an operation unit to accept a user input, and a watermark image setting unit to change the first transparency in accordance with the user input through the operation unit.

Such a configuration enables a user to adjust the transparency of the overlap part of the watermark image to a desirable value. Since in this case only adjustment of the first transparency is allowed, the configuration of the watermark image setting unit can be simplified.

In at least one aspect, the information processing device further comprises an operation unit to accept a user input, and a watermark image setting unit to change the first transparency and the second transparency in accordance with the user input through the operation unit.

Such a configuration enables a user to adjust both of the first transparency of the overlap part and the second transparency of the non-overlap part of the watermark image to desirable values so that both of the entire watermark image and the main image can be recognizable in the overlap image.

In at least one aspect, the first transparency of the overlap part in the watermark image is higher than transparency of the watermark image defined before adjustment by the transparency adjustment unit.

In at least one aspect, the first transparency and the second transparency are adjusted to satisfy a relationship:

$$0\% < Tr2 < Tr1$$

where Tr1 (%) and Tr2 (%) represent the first transparency and the second transparency, respectively.

According to another aspect of the invention, there is provided a computer usable medium having computer readable instructions stored thereon, which, when executed by a computer, are configured to analyze a main image and a watermark image to be added to the main image to determine an overlap part of the main image and the watermark image, to adjust transparency of the overlap part in the watermark image to first transparency, and to obtain an overlap image of the main image and the watermark image of which transparency is adjusted by the transparency adjustment unit by overlaying the watermark image of which transparency is adjusted on the main image.

With this configuration, it is possible to change the first transparency of the overlap part of the watermark image so that both of the main image and the watermark image are recognizable in the overlap image as in the case of the transparent mode. In addition, since the adjustment of the transparency can be applied only to the overlap part, it becomes possible to keep a non-overlap part in the watermark image as well as the entire watermark image and the main image recognizable.

In at least one aspect, wherein when the instructions are executed by the computer, the instructions are further configured to adjust transparency of a non-overlap part in the watermark image to a second transparency.

With this configuration, it is possible to adjust the transparency of the non-overlap part to desirable transparency so that the entire watermark image and the main image are recognizable.

In at least one aspect, when the instructions are executed by the computer, the instructions are further configured to transmit the overlap image to an external printer through a network.

In at least one aspect, the second transparency is equal to transparency of the watermark image defined before transparency of the watermark image is adjusted.

With this configuration, it is possible to keep the non-overlap part of the watermark image recognizable while simplifying the transparency adjustment.

In at least one aspect, when the instructions are executed by the computer, the instructions are further configured to accept a user input through an operation unit, and to change the first transparency in accordance with the user input through the operation unit.

Such a configuration enables a user to adjust the transparency of the overlap part of the watermark image to a desirable value. Since in this case only adjustment of the first transparency is allowed, the configuration for transparency adjustment can be simplified.

In at least one aspect, when the instructions are executed by the computer, the instructions are further configured to accept a user input through an operation unit; and to change the first transparency and the second transparency in accordance with the user input through the operation unit.

Such a configuration enables a user to adjust both of the first transparency of the overlap part and the second transparency of the non-overlap part of the watermark image to desirable values so that both of the entire watermark image and the main image can be recognizable in the overlap image.

In at least one aspect, the first transparency of the overlap part in the watermark image is higher than transparency of the watermark image defined before the transparency of the watermark image is adjusted.

In at least one aspect, the first transparency and the second transparency are adjusted to satisfy a relationship:

$$0\% < Tr2 < Tr1$$

where Tr1 (%) and Tr2 (%) represent the first transparency and the second transparency, respectively.

Embodiment

Hereafter, an embodiment according to the invention will be described with reference to the accompanying drawings.

Figure 1:
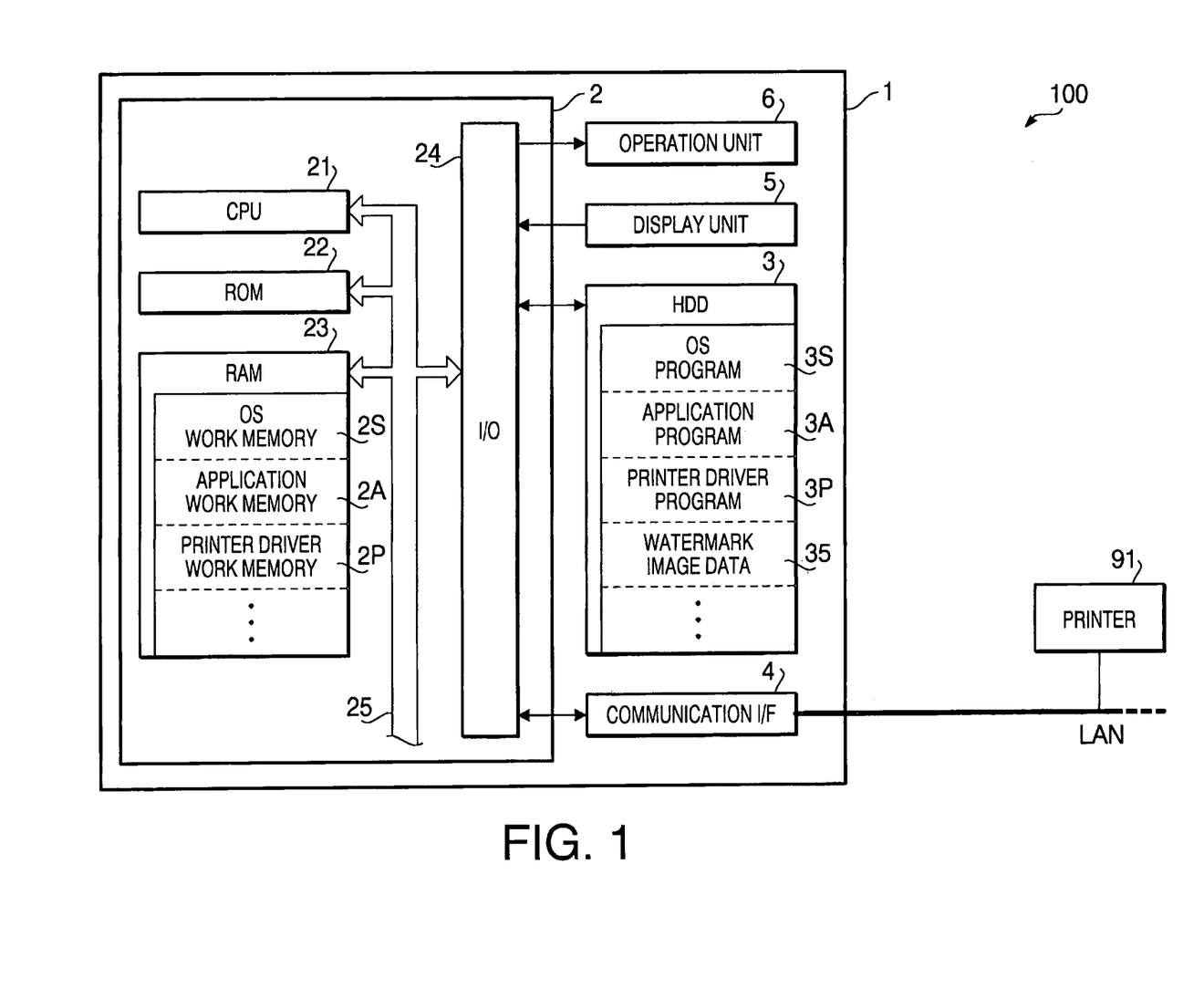
FIG. 1 illustrates a printing system in which a PC is connected to a printer through a LAN.

FIG. 1 illustrates a printing system 100 in which a PC (Personal Computer) 1 is connected to a printer 91 through a LAN (Local Area Network). In FIG. 1, a block diagram of a control system of the PC 1 is also illustrated. In the printing system 100, the printer 91 executes a printing process when receiving a print command from the PC 1. As shown in FIG. 1, the PC 1 has an HDD (Hard Disk Drive) 3 storing a printer driver program 3P functioning, when executed by a CPU 21, as a printer driver 8P (see FIG. 2). The printer driver 8P has a watermark printing function which is described in detail below.

Figure 2:
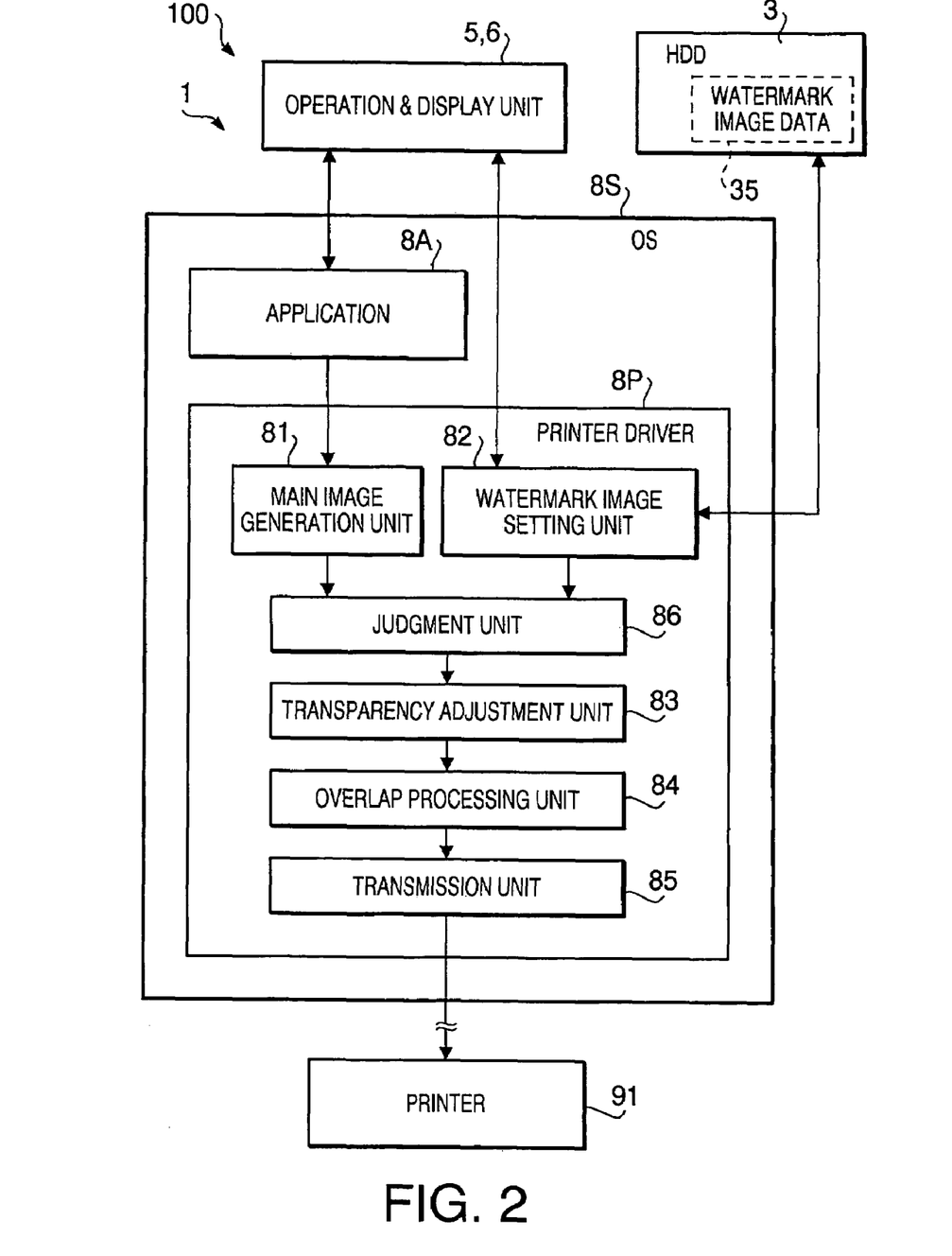
FIG. 2 is a functional block diagram concerning an OS and a printer driver running on the PC shown in FIG. 1.

As shown in FIG. 1, the PC 1 includes the HDD 3, a communication interface (I/F) 4, a display unit 5, an operation unit 6 and a control unit 2. The HDD 3 stores an OS program 3S functioning as an OS (operating system) 8S, an application program 3A functioning as an application 8A, and the printer driver program 3P (see FIG. 2). The HDD 3 further stores watermark image data 3S used for the watermark printing function. The communication interface 4 functions as a network adapter which interfaces the PC 1 with a device (e.g., the printer 91) through the LAN. FIG. 2 is a functional block diagram concerning the OS 8S and the printer driver 8P.

The display unit 5 is, for example, a CRT or an LCD. The operation unit 6 includes a pointing device (e.g., a mouse) and a keyboard. The control unit 2 includes the CPU 21, a ROM 22, a RAM 23 and an input/output interface 24, which are connected to each other via a bus 25. The CPU 21 executes programs stored in the HDD 3 to control the functions of the PC 1. The OS program 3P is executed under control of the CPU 21 using an OS work memory 2S assigned in the RAM 23. The application program 3A and the printer driver program 3P are executed under control of the CPU 21 using an application work memory 2A and a printer driver work memory 2P assigned in the RAM 23.

The printer 91 is communicatably connected to the PC 1 through the LAN. The printer 91 executes a printing process in accordance with commands transmitted from the printer driver 8P running on the PC 1. Although in this embodiment the printer 91 is connected to the PC 1 via the LAN, the printer 91 may be directly connected to the PC 1 through a parallel port or a USB (Universal Serial Bus) port.

Hereafter, a print process and a setting process executed by the printer driver 8P are explained. The printer driver 8P is a program module to generate print data in accordance with settings concerning functions of the printer 91, and to transmit the print data to the printer 91. As shown in FIG. 2, the printer driver 8P includes a main image generation unit 81, a watermark image setting unit 82, a judgment unit 86, a transparency adjustment unit 83, and an overlap processing unit 84, and a transmission unit 85.

Figure 3:
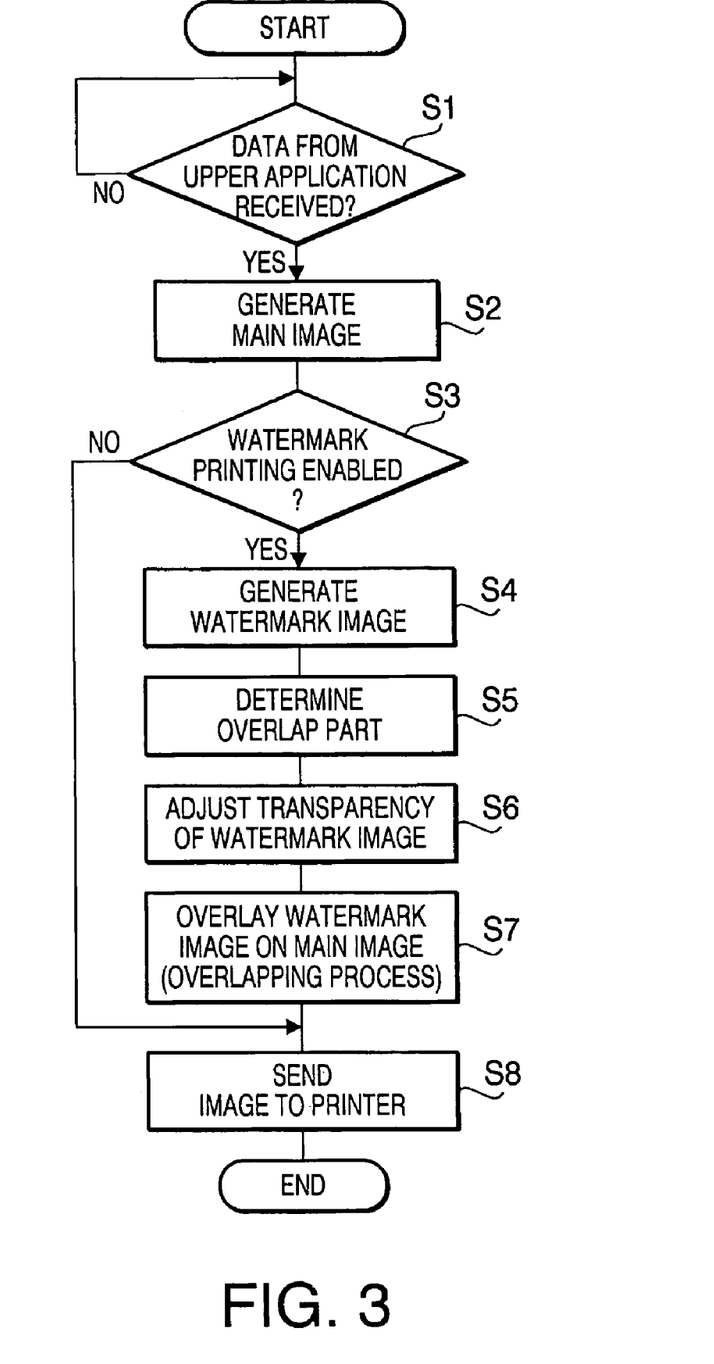
FIG. 3 is a flowchart illustrating a print process.

FIG. 3 is a flowchart illustrating the print process executed by the printer driver 8P. First, the printer driver 8P judges whether document data, which is provided from the application 8A to print out the document when the application 8A finishes generating the document data, is received (step S1). If the document data is received (S1: YES), the main image generation unit 81 generates print data (for example, in a form of bitmap data) of a main image to be printed based on the received document data (step S2).

The watermark image setting unit 82 operates to allow a user to make settings for the watermark printing function (e.g., settings as to whether to execute watermark printing and parameters regarding the watermark printing function) through the operation unit 6. In step S3, the watermark image setting unit 82 judges whether execution of watermark printing is enabled. If the execution of watermark printing is enabled (S3: YES), the watermark image setting unit 82 generates a watermark image (for example, in a form of bitmap data) using the watermark image data 35 containing various types of data, such as fonts and patterns, necessary for generation of watermark images (step S4). As described later, the function of the watermark image setting unit 82 may be achieved on a property window allowing the user to make settings for watermark printing through the operation unit 6.

Figure 5:
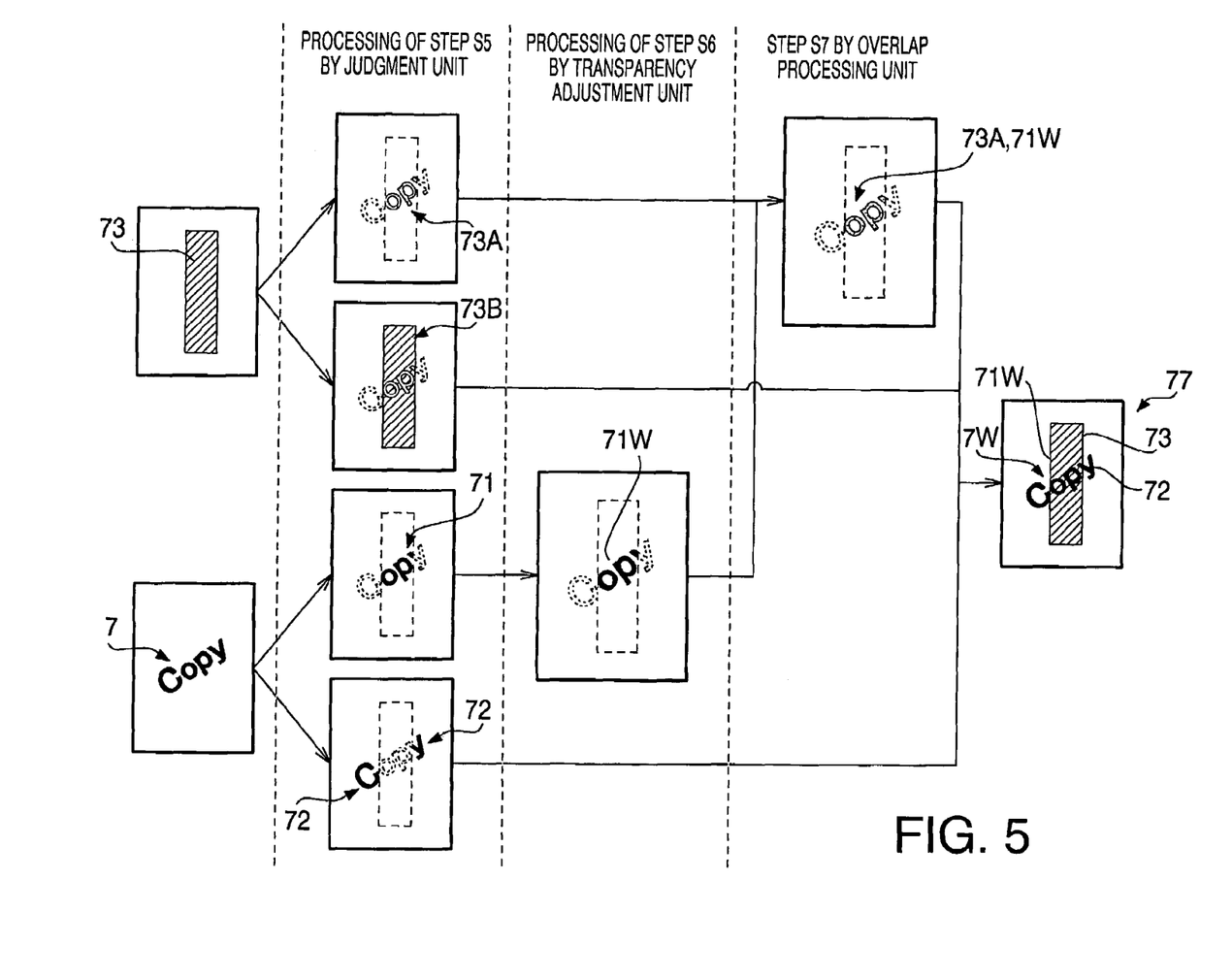
FIG. 5 illustrates an example of image processing executed by the printer driver shown in FIG. 2.

Next, in steps S5 to S7, image processing illustrated in FIG. 5 is executed on the main image (reference number "73" is assigned to the main image in FIG. 5) and the watermark image (reference number "7" is assigned to the watermark image in FIG. 5) under control of the judgment unit 86, the transparency adjustment unit 83, and the overlap processing unit 84. In an example of image processing shown in FIG. 5, the transparency adjustment unit 83 executes a transparency process for an overlap part 71 (which is a part of the watermark image 7 overlapping with the main image 73) to adjust transparency of the overlap part 71 to first transparency, and does not execute the transparency process for non-overlap parts 72 (which are parts of the watermark image 7 not overlapping with the main image 73), i.e., sets the transparency of the non-overlap parts 72 for second transparency (0%).

In step S5, the judgment unit 86 analyzes the main image 73 and the watermark image 7 to determine an overlap part 73A, which is a part of the main image 73 overlapping with the watermark image 7, and to determine a non-overlap part 73B which is a part of the main image 73 not overlapping with the watermark image 7. More specifically, in step S5, a mask is generated by obtaining a logical product of the main image 73 and the watermark image 7, and the mask is used to determine mask parts (overlap parts) 73A and 71 and non-mask parts (non-overlap parts) 73B and 72 (see FIG. 5).

Figure 7A:
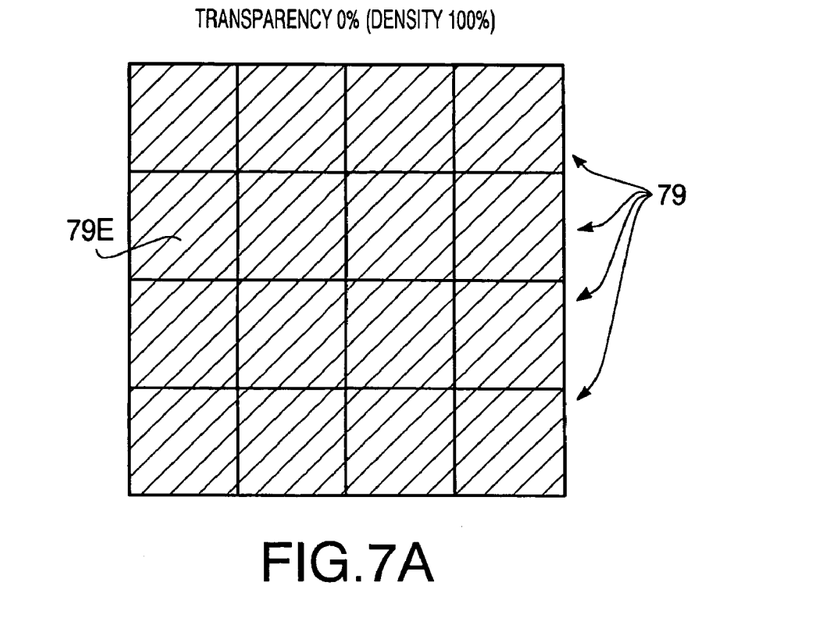
FIGS. 7A and 7B are explanatory illustrations concerning a transparency process.
Figure 7B:
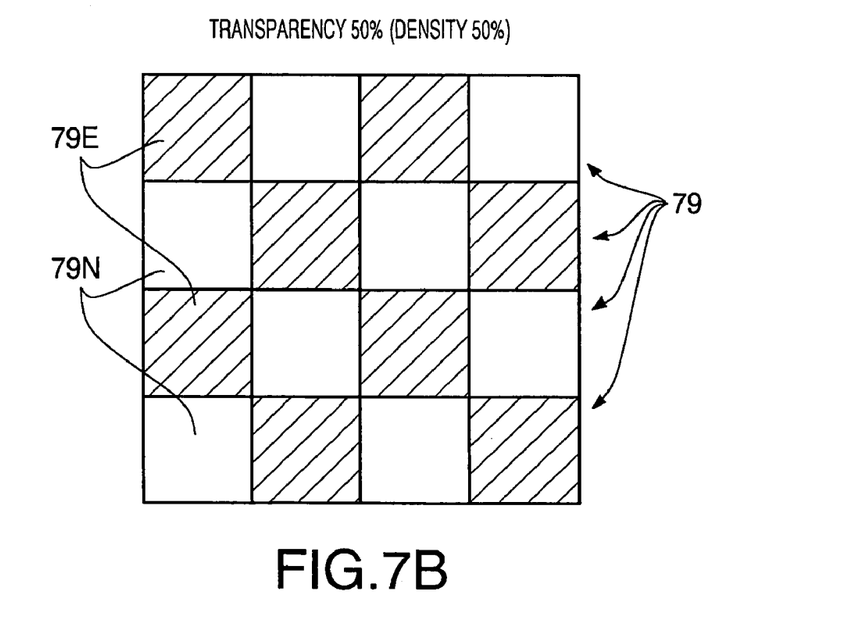

Next, the transparency adjustment unit 83 executes the transparency process on the overlap part (mask part) 71 of the watermark image 7 to adjust transparency of the overlap part (mask part) 71 and to generate a sectional image 71W having first transparency (hereafter, referred to as a first transparency section 71W). For example, the transparency process is executed as follows. As shown in FIG. 7A, all dots 79 of the watermark image 7 are filled in black (filled dots are assigned "79E" in FIGS. 7A and 7B). A state of the image shown in FIG. 7A corresponds to transparency of 0% (i.e., density of 100%). By the transparency process, transparency is increased by thinning out the filled dots 79E (i.e., by replacing a part of the filled dots with unfilled dots 79N). FIG. 7B illustrates an example of a thinned-out image having transparency of 50%. In the example of FIG. 7B, the number of filled dots 79E is equal to the number of unfilled dots 79N, and the unfilled dots 79N are arranged in a staggered configuration. When an adjusted image (an image which is adjusted its transparency) is overlaid on a base image, colors of the base image appears on the unfilled dots 79N of the adjusted image.

Figure 4:
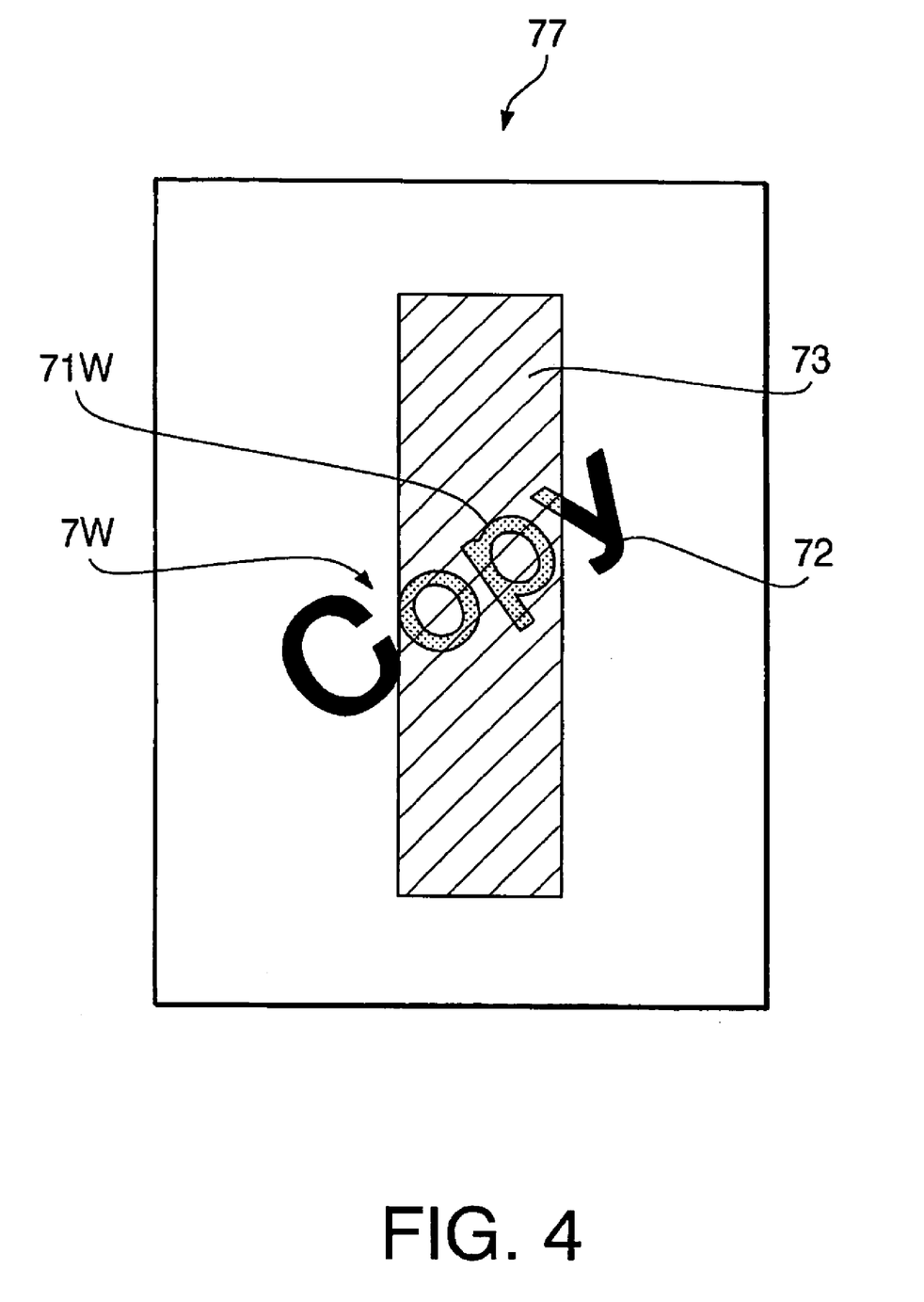
FIG. 4 illustrates an example of an overlap image of a main image and a watermark image.

After step S6 is finished, the overlap processing unit 84 performs a graphic drawing process so that the first transparency section 71W overlaps with the mask part 73A of the main image 73 (step S7). Further, the overlap processing unit 84 performs the graphic drawing process on the non-mask parts 73B and 72 using a result of an exclusive-OR of the main image 73 and the watermark image 7. Consequently, an overlap image 77 is obtained as shown in FIGS. 4 and 5. The overlap image 77 is then transmitted to the printer 91 through the transmission unit 85 (step S8).

Since the first transparency section 71W which has undergone the transparency process overlaps with the main image 73, both of the main image 73 and the watermark image 7 are recognizable in the overlap part, and the non-overlap parts 72 of the watermark image 7 is in a clearly recognizable state because the non-overlap parts 72 have not undergone the transparency process (see FIG. 4).

Figure 6:
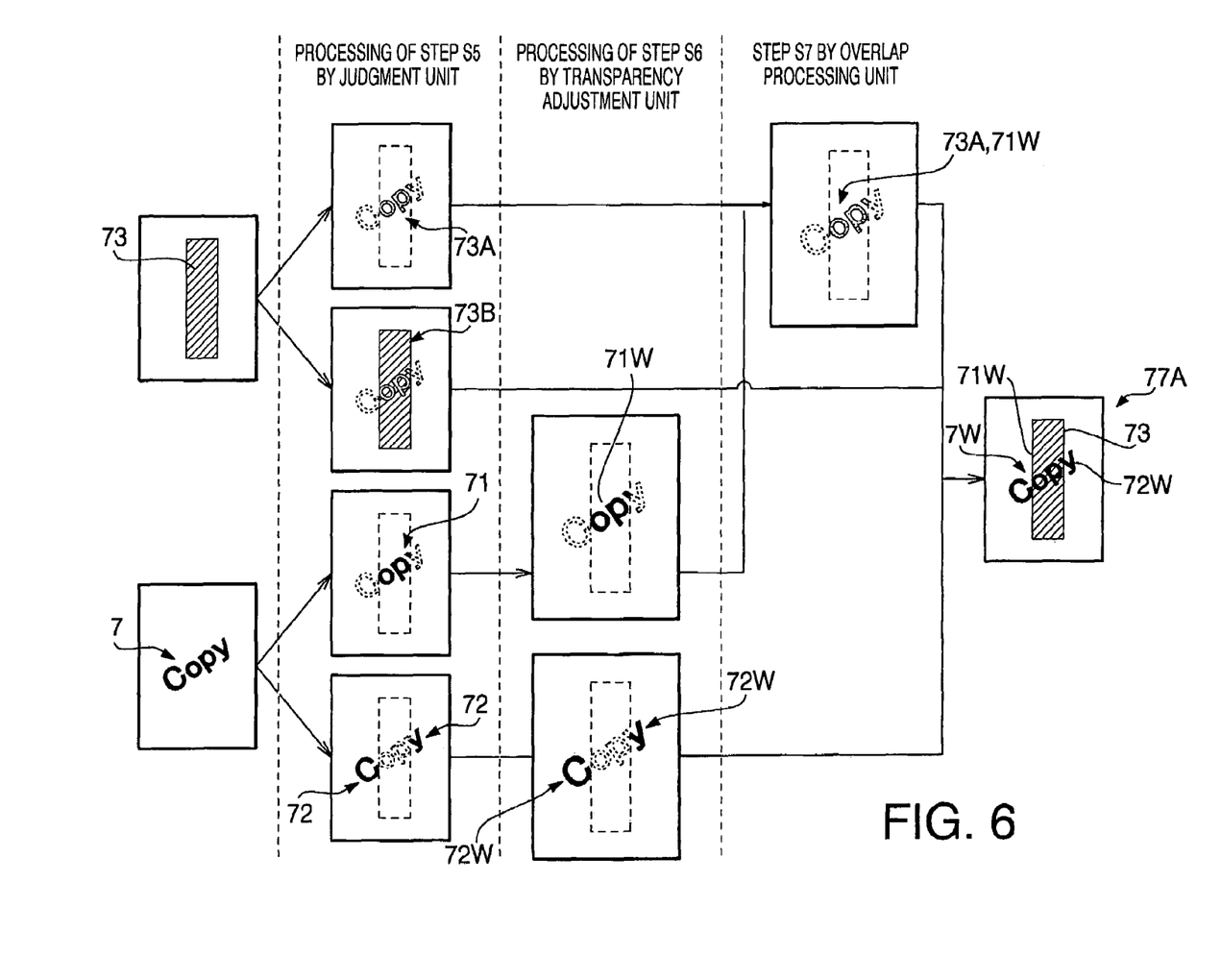
FIG. 6 illustrates another example of image processing executed by the printer driver shown in FIG. 2.

FIG. 6 shows another example of image processing to be executed in step S5 to S8 of the print process. In the example shown in FIG. 6, a transparency process is executed for the non-overlap parts 72 as well as the overlap part 71. In FIG. 6, to elements which are substantially the same as those shown in FIG. 5, the same reference numbers are assigned. The transparency adjustment unit 83 executes the transparency process for the non-overlap parts 72 of the watermark image 7, and adjusts the transparency of the non-overlap parts 72 to generate sectional images 72W having second transparency (hereafter, referred to as second transparency sections 72W) (step S6).

The second transparency sections 72W are processed to have transparency lower than that of the first transparency section 71W, so that the second transparency sections 72W are recognizable more clearly than the first transparency section 71W. The transparency is set to have a following relationship.

0%<(second transparency)<(first transparency)

After the second transparency sections 72W are generated, the overlap processing unit 84 performs a graphic drawing process so that the first transparency section 71W overlaps with the mask part 73A (step S7). The overlap processing unit 84 also performs the graphic drawing process for the second transparent sections 72W and the non-overlap part 73B of the main image 73. Consequently, an overlap image 77A is obtained.

Figure 8:
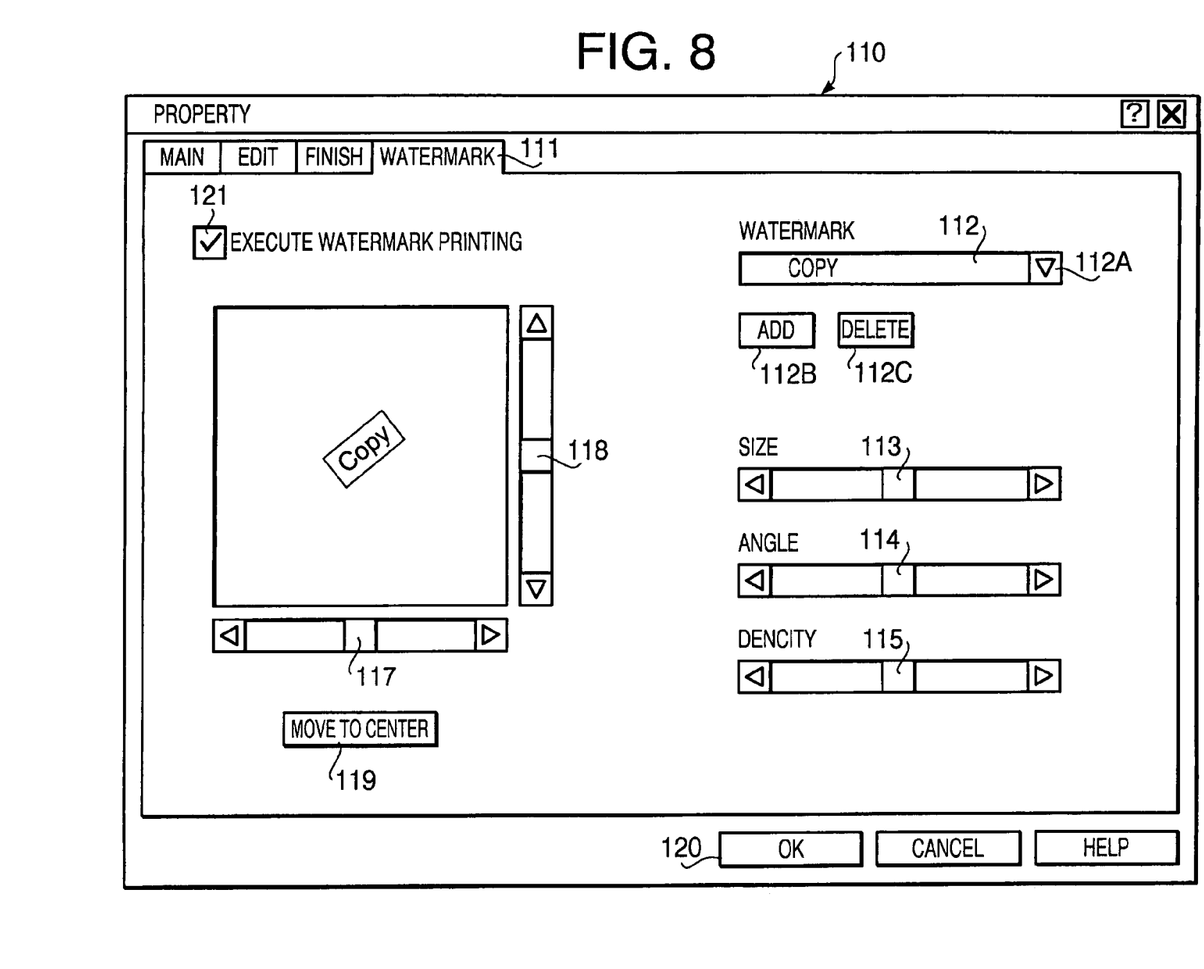
FIG. 8 illustrates a property setting interface to make setting for watermark printing.

Hereafter, the setting process is explained with reference to FIG. 8. In the setting process, the watermark image setting unit 82 generates a property setting interface (window) 110 having a watermark tab 111 allowing the user to make settings of the watermark printing function through the operation unit 6. In the watermark tab 111, a selection field 121 to designate whether to execute the watermark printing, setting fields 112 to 119 concerning parameters of the watermark printing function, and an OK button 120 to apply the inputted settings are included. The setting field 112 is used to input a word to be formed as a watermark. The setting field 113 is used to set the size of the watermark. The setting field 114 is used to set an inclination angle of the watermark with respect to the horizontal direction. The setting field 115 is used to input the density of the watermark. The setting fields 117 to 119 are used to adjust the position of the watermark on a sheet.

Since in the embodiment the printer driver 8P is configured to support the transparency process only for adjusting the first transparency of the overlap part 71 of the watermark image 7, the adjustment of the density through the input field 115 of the watermark tab 111 is only applied to the first transparency of the overlap part 71 of the watermark image 7.

Figure 9:
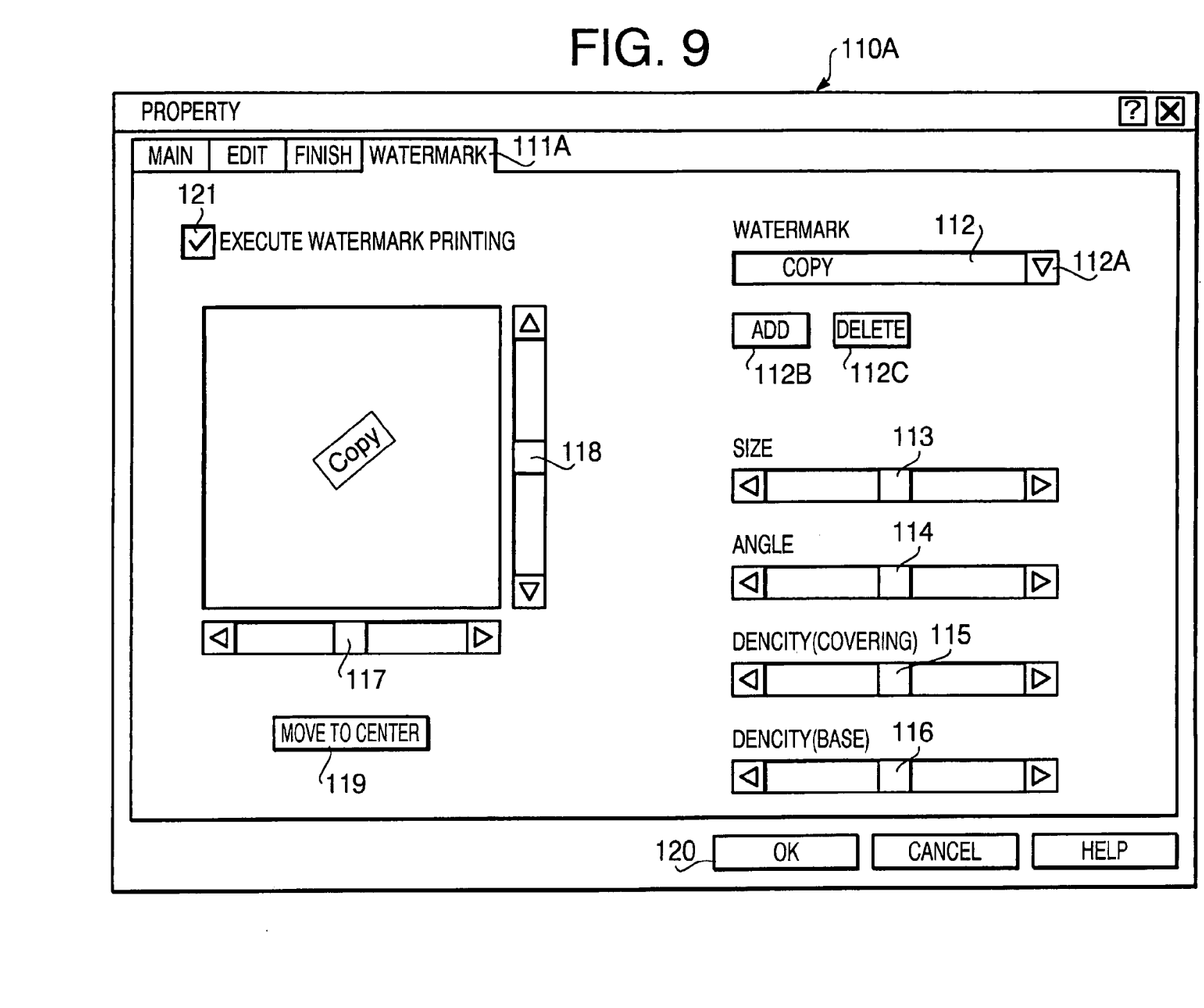
FIG. 9 is another example of a property setting interface to make setting for watermark printing.

FIG. 9 shows an another example of a property setting interface allowing the user to designate both of the transparency of the overlap part 71 and the transparency of the non-overlap parts 72 of the watermark image 7. In a watermark tab 111A of a property setting interface 110A shown in FIG. 9, the input field 115 is used to designate the first transparency of the overlap part 71 (a covering pattern), and an input field 116 is used to designate the second transparency of the non-overlap parts 72 (a base pattern).

Although the present invention has been described in considerable detail with reference to certain preferred embodiments thereof, other embodiments are possible.

The watermark tab may be configured such that an input field for one of the first transparency and second transparency is placed on the watermark tab and the other transparency is determined so that a predetermined difference is kept between the first transparency and second transparency.

What is claimed is:

1. An information processing device, comprising:
a determination unit to analyze a main image and a watermark image to be added to the main image to determine an overlap part of the main image and the watermark image;
a transparency adjustment unit to adjust transparency of the overlap part in the watermark image to first transparency, and to adjust transparency of a non-overlap part in the watermark image to a second transparency, wherein the first transparency and the second transparency are adjusted to satisfy a relationship:

$$0\% < Tr2 < Tr1$$

wherein Tr1 (%) and Tr2 (%) represent the first transparency and the second transparency, respectively; and
an overlap processing unit to obtain an overlap image of the main image and the watermark image of which transparency is adjusted by the transparency adjustment unit by overlaying the watermark image of which transparency is adjusted on the main image.

2. The information processing device according to claim 1, further comprising: a transmission unit to transmit the overlap image to an external printer through a network.

3. The information processing device according to claim 1 wherein the second transparency is equal to transparency of the watermark image defined before adjustment by the transparency adjustment unit.

4. The information processing device according to claim 1, further comprising:
an operation unit to accept a user input; and
a watermark image setting unit to change the first transparency in accordance with the user input through the operation unit.

5. The information processing device according to claim 1, further comprising:
an operation unit to accept a user input; and
a watermark image setting unit to change the first transparency and the second transparency in accordance with the user input through the operation unit.

6. The information processing device according to claim 1 wherein the first transparency of the overlap part in the watermark image is higher than transparency of the watermark image defined before adjustment by the transparency adjustment unit.

7. A computer usable medium having computer readable instructions stored thereon, which, when executed by a computer, are configured to:
analyze a main image and a watermark image to be added to the main image to determine an overlap part of the main image and the watermark image;
adjust transparency of the overlap part in the in the watermark image to first transparency and to adjust transparency of a non-overlap part in the watermark image to second transparency, wherein the first transparency and the second transparency are adjusted to satisfy a relationship:

$$0\% < Tr2 < Tr1$$

wherein Tr1 (%) and Tr2 (%) represent the first transparency and the second transparency, respectively; and
obtain an overlap image of the main image and the watermark image of which transparency is adjusted by the transparency adjustment unit by overlaying the watermark image of whichever transparency is adjusted on the main image.

8. The computer usable medium according to claim 7, wherein when the instructions are executed by the computer, the instructions are further configured to transmit the overlap image to an external printer through a network.

9. The computer usable medium according to claim 7, wherein the second transparency is equal to transparency of the watermark image defined before transparency of the watermark image is adjusted.

10. The computer usable medium according to claim 7 wherein when the instructions are executed by the computer, the instructions are further configured to:
accept a user input through an operation unit; and
change the first transparency in accordance with the user input through the operation unit.

11. The computer usable medium according to claim 7, wherein when the instructions are executed by the computer, the instructions are further configured to:
accept a user input through an operation unit; and
change the first transparency and the second transparency in accordance with the user input through the operation unit.

12. The computer usable medium according to claim 7 wherein the first transparency of the overlap part in the watermark image is higher than transparency of the watermark image defined before the transparency of the watermark image is adjusted.

* * * * *

UNITED STATES PATENT AND TRADEMARK OFFICE
CERTIFICATE OF CORRECTION

PATENT NO. : 7,643,651 B2
APPLICATION NO. : 11/502417
DATED : January 5, 2010
INVENTOR(S) : Daisuke Asai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 802 days.

Signed and Sealed this

Twenty-first Day of December, 2010

David J. Kappos
*Director of the United States Patent and Trademark Office*